Sept. 26, 1961    D. M. ROCOVICH    3,001,287
VINYL STOCK CUTTING BLADE
Filed May 26, 1958

INVENTOR.
Daniel M. Rocovich.
BY E. C. McRae
J. R. Faulkner
P. H. Oster
ATTORNEYS.

3,001,287
VINYL STOCK CUTTING BLADE

Daniel M. Rocovich, Lake Orion, Mich., assignor to Ford Motor Company, Dearborn, Mich., a corporation of Delaware
Filed May 26, 1958, Ser. No. 737,579
1 Claim. (Cl. 30—355)

This invention relates to cutter blades for straight blade cutting machines, such as are used in cutting stacked sheets of material.

In recent years the trend in motor vehicle body interior trim manufacturing has been the substitution of vinyl or thermoplastic resin materials for the more conventional cloth panel coverings formerly utilized. The cutting of stacked sheets of vinyl material has presented problems not encountered in the cutting of stacked sheets of cloth material. The primary difficulty encountered has been the effect of the heat generated by the rapidly reciprocating cutter blade as it is pushed through the stacked sheets of material, particularly when the stacked sheets comprise what is known in the art as unsupported vinyl, that is, vinyl sheets without any backing material such as paper, cardboard, fibreboard or the like. The heat generated by the ordinary cutter blade results in a softening of the thermoplastic resin and, upon subsequent cooling, a fusion or lamination of adjacent layers. Each ply of material in the cut then has to be pulled apart individually by hand. This extra operation consumes production time. The fused material when separated provides edges having poor quality.

One solution has been to equip the cutting machine with a blower device to force cooling air downwardly alongside the cutting blade. The efficiency of this system is not very high since the major portion of the air stream is merely deflected off the surface of the top layer of the material. A second solution has been to equip the cutting machine with a water spray apparatus. Here again, the effectiveness leaves much to be desired since the cooling spray is not very effective in penetrating the stacked layers of material and the water splashing about is messy.

It is an object of the present invention to provide a simple and improved cutting blade effective to cut unsupported vinyl plastic material or the like with a minimum of edge fusion. More particularly, the present invention embodies a straight knife cutter blade comprising a blade member having a bevelled serrated cutting edge thereon. The blade member is further provided with air entrapment means extending transversely inwardly from the base and peak of each serration. In the preferred embodiment of the blade, the air entrapment means comprises a series of slots extending in a direction at right angles to the direction in which the blade reciprocates. The rapid up and down movement of the blade causes the blade slots to pump cooling air into the working area of the blade and to provide for more rapid diffusion of heat from the cutting edges.

Other objects, advantages and features of the present invention will be made more apparent as this description proceeds, particularly when considered in connection with the accompanying drawing, wherein.

Figures 1, 2, 3:
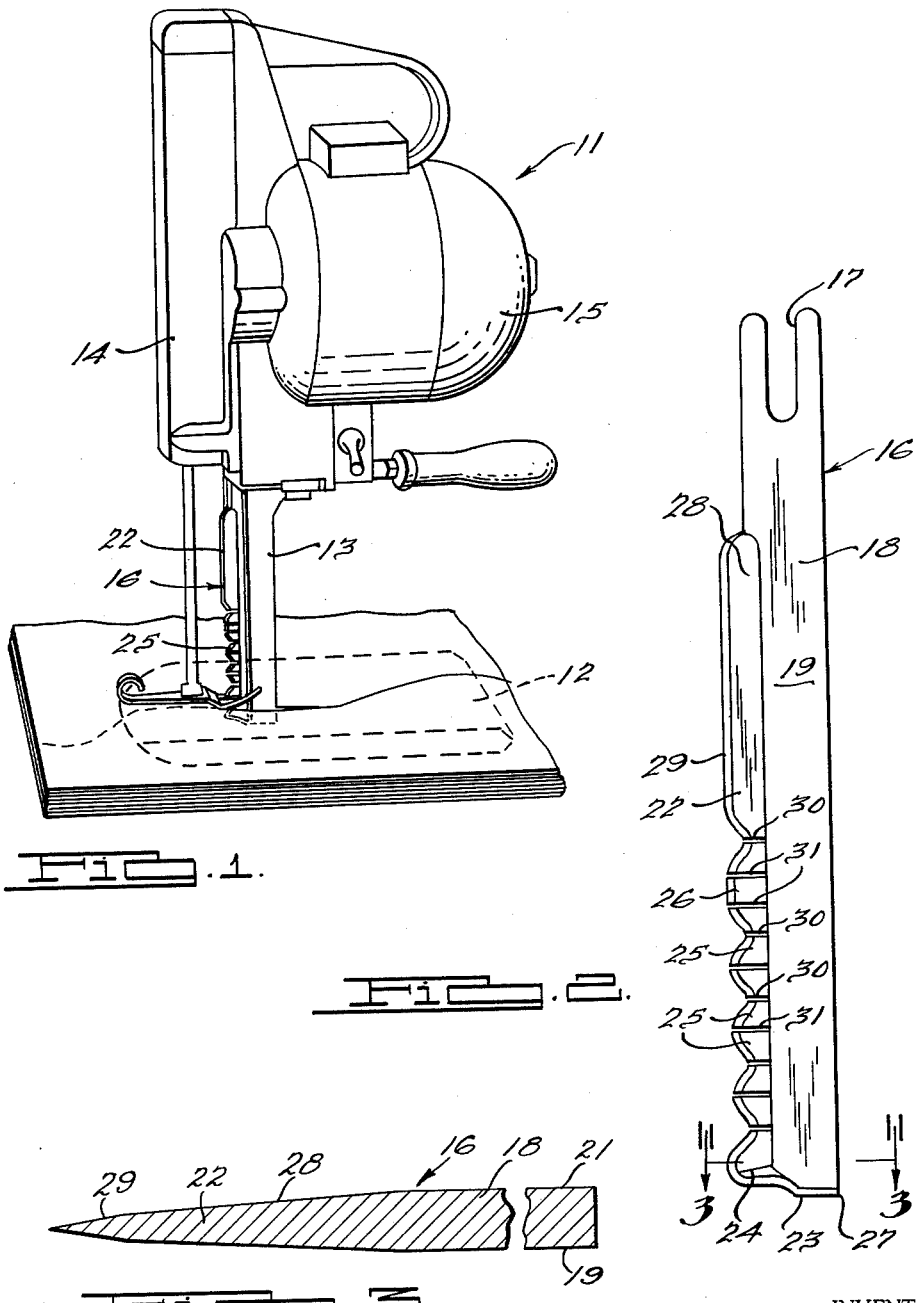
FIG. 1 is a perspective view of a straight blade cutter machine illustrating a cutter blade embodying the principle of the present invention.
FIG. 2 is an enlarged side elevation of the cutter blade.
FIG. 3 is an enlarged section taken substantially through line 3—3 of FIG. 2 looking in the direction of the arrows.

Referring now to FIG. 1, there is illustrated a commercially available type of cutter machine, generally designated 11. The cutter machine 11 is provided with a base plate 12, a column 13 and a housing 14 carrying an electric motor 15. The electric motor 15 is adapted to be coupled through suitable mechanism (not shown) to the cutter blade, generally designated 16, the mechanism being such that the rotation of the motor shaft is converted to reciprocatory movement of the cutter blade 16.

The cutter blade 16 comprises a relatively thin elongated piece of alloy steel having good cutting edge retaining qualities. The blade 16 is provided at one longitudinal end, the upper end in operative position, with a bifurcated tang portion 17 adapted to be suitably coupled or connected to the cutter machine drive mechanism.

The main body portion 18 of the blade 16 is provided with parallel side faces 19 and 21. These side faces are slidable between suitable guide elements (not shown) in the cutter machine column 13. Forward of the parallel side face portion 18, the blade is provided with a double bevelled portion 22. In the illustrated embodiment, the double bevelled portion 22, as viewed in FIG. 2, has a width approximately equal to half the width of the main body portion 18. As shown in FIG. 2, the lower edge 23 of the bevelled portion 22 is rounded as at 24. The rounded lead corner 24 blends into a series of regular serrations 25 which terminate at an elongated serration 26. The serrations extend upwardly for substantially half the length of the double bevelled portion 22 and inwardly to a depth of substantially half the width of the bevelled portion 22.

Beginning at the lower edge corner 27 and extending along the serrations 25 to the unserrated portion 28 of the bevelled portion 22 of the blade, the leading edge of the blade is provided with a sharp double bevel 29 which provides the cutting edge of the blade.

An important feature of the present invention is the provision of a series of transversely extending slots beginning with the short slot 30 which extends inwardly from the base of the lowermost of the serrations 25 and terminates at the division line between the main body portion 18 and the double bevelled portion 22 of the blade. The next succeeding slot 31 extends inwardly from the peak of a serration 25 and terminates on the same line with the short slot. Subsequent short and long slots follow the same pattern, except that it will be noted that the elongated serration 26 is provided with two long slots 31 before the last short slot 30 is reached. The spacing between slots is substantially equal.

The effect of the slotted blade construction and arrangement may be described as follows: The stacked sheets of unsupported vinyl are laid out on a cutting table and may comprise forty-six or more sheets of the material. The cutter operator causes the blade 18 to be reciprocated and then bodily pushes the cutting machine into the material, the machine sliding or skidding on its base plate 12 on the cutting table surface. The cutting action results from the reciprocation of the blade 18 and forward thrust exerted by the operator as he follows the templet or pattern lines.

On each down stroke of the blade the slots 30 and 31 act in the nature of an air pump and pump cooling air into the cutting area. Further, the slots aid in the dissipation of heat from the blade working or cutting edges. Accordingly, there is no build up of blade or material temperature along the cut line and substantially no fusing of the material plies occurs.

The foregoing simple improvement in the cutting blade accomplishes the desired result of a clean cut with easily separated plies and makes unnecessary the mounting of air blower or water spray devices on the cutting machine.

It will be understood that the invention is not to be limited to the exact construction shown and described, but that various changes and modifications may be made without departing from the spirit and scope of the invention, as defined in the appended claim.

What is claimed is:

A straight knife cutter blade adapted to be mounted for reciprocatory movement comprising a blade member having a leading edge portion provided with a first bevelled portion forming a cutting edge and a second bevelled portion extending rearwardly of said first bevelled portion, said bevelled portions having a series of serrations of uniform longitudinal dimension, the depth of said serrations being less than the depth of said bevelled portions, and air entrapment means extending inwardly from the peak and base of adjacent serrations substantially for the depth of said bevelled portions, said air entrapment means comprising a plurality of slots extending in a direction normal to the longitudinal axis of said blade.

References Cited in the file of this patent

UNITED STATES PATENTS

| | | |
|---|---|---|
| 913,092 | Barnes | Feb. 23, 1909 |
| 1,723,843 | Chapin | Aug. 6, 1929 |
| 2,171,604 | Segal | Sept. 5, 1939 |
| 2,671,267 | Michalek | Mar. 9, 1954 |